(12) United States Patent
Horie et al.

(10) Patent No.: US 7,700,219 B2
(45) Date of Patent: Apr. 20, 2010

(54) STRUCTURE HAVING THREE-DIMENSIONAL NETWORK SKELETON, METHOD FOR PRODUCING THE STRUCTURE, AND FUEL CELL INCLUDING THE STRUCTURE

(75) Inventors: Ryoko Horie, Yokohama (JP); Hiroshi Okura, Hiratsuka (JP); Nobuhiro Yasui, Kawasaki (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 11/497,391

(22) Filed: Aug. 2, 2006

(65) Prior Publication Data
US 2007/0034602 A1 Feb. 15, 2007

(30) Foreign Application Priority Data
Aug. 12, 2005 (JP) .............................. 2005-234618

(51) Int. Cl.
*H01M 2/00* (2006.01)
*C03C 25/68* (2006.01)

(52) U.S. Cl. .......................................... 429/40; 216/58
(58) Field of Classification Search .................. 216/58; 429/30, 34, 36, 38, 39, 40
See application file for complete search history.

(56) References Cited

U.S. PATENT DOCUMENTS

| 6,143,191 | A  | * | 11/2000 | Baum et al. ................... | 216/63 |
| 2005/0079374 | A1 | * | 4/2005 | Asai ............................ | 428/613 |
| 2006/0105275 | A1 | * | 5/2006 | Maloney et al. ............. | 430/320 |
| 2006/0252635 | A1 | * | 11/2006 | Ovshinsky et al. .......... | 502/101 |
| 2007/0026269 | A1 | * | 2/2007 | Nakakubo ................... | 429/13 |
| 2007/0045756 | A1 | * | 3/2007 | Chang et al. ................ | 257/414 |

* cited by examiner

*Primary Examiner*—Patrick Ryan
*Assistant Examiner*—Monique Wills
(74) *Attorney, Agent, or Firm*—Fitzpatrick, Cella, Harper & Scinto (57) ABSTRACT

The present invention provides a new method for producing a structure having a three-dimensional network skeleton. The method includes providing a film including a first material and a second material and removing the second material contained in the film by dry etching. The first material contains a noble metal and is dispersed in the second material.

14 Claims, 6 Drawing Sheets

STRUCTURE HAVING THREE-DIMENSIONAL NETWORK SKELETON, METHOD FOR PRODUCING THE STRUCTURE, AND FUEL CELL INCLUDING THE STRUCTURE

BACKGROUND OF THE INVENTION

1. Field of the Invention

The present invention relates to a structure having a three-dimensional network skeleton composed of a material including a noble metal, a method for producing the structure, a membrane electrode assembly for a fuel cell including the structure, and a fuel cell.

2. Description of the Related Art

A porous noble metal has widely been studied with the expectation that it can be applied to an electrode of a fuel cell.

A method for producing such a porous noble metal is described in Japanese Patent Laid-Open No. 2003-221601 (a U.S. equivalent is US2005/0079374A1).

Japanese Patent Laid-Open No. 2003-221601 describes a technique in which nanometer-sized silica particles are used as a template (adsorbent) in the production of a porous noble metal. Specifically, a noble metal compound is adsorbed onto an aggregate of the silica particles. After the noble metal compound is reduced into a noble metal, the silica particles are dissolved away with NaOH to produce a porous noble metal.

In the technique described in Japanese Patent Laid-Open No. 2003-221601, a porous noble metal is produced by a wet process. The present inventors accomplished the present invention through a study on a new method for producing a porous noble metal by a dry process.

SUMMARY OF THE INVENTION

A method for producing a structure having a three-dimensional network skeleton according to the present invention includes the steps of:

providing a film including a first material and a second material, the first material containing a noble metal and being dispersed in the second material; and removing the second material contained in the film by dry etching.

A structure according to the present invention has a three-dimensional network skeleton composed of a material including a noble metal. The diameter of the skeleton may be 100 nm or less.

A membrane electrode assembly for a fuel cell according to the present invention includes a solid polymer electrolyte and a catalyst layer. The catalyst layer has a three-dimensional network skeleton composed of a material including a noble metal. The diameter of the skeleton may be 100 nm or less.

Further features of the present invention will become apparent from the following description of exemplary embodiments with reference to the attached drawings.

DESCRIPTION OF THE EMBODIMENTS

The present invention will be described in detail with reference to preferred embodiments. However, the present invention is not limited to these preferred embodiments.

(Method for Producing Structure Having Three-Dimensional Network Skeleton)

A method for producing a structure according to the present invention will firstly be described.

A method for producing a structure according to the present invention includes providing a film including a first material and a second material (first step) and removing the second material contained in the film by dry etching (second step). The first material contains a noble metal and is dispersed in the second material.

(1) First Step

First, a film for use in a noble metal three-dimensional network structure is prepared.

For purposes of illustration, the first material of the film is assumed to be platinum and the second material of the film is assumed to be silicon.

In the present embodiment, a film is formed by sputtering. For example, a base substrate for the film formation and a silicon target having a platinum chip thereon are placed in a sputtering apparatus. The platinum chip and the silicon target are sputtered in an atmosphere, for example, of argon to form a film containing platinum dispersed in silicon on the base substrate.

The percentage of platinum in the resulting film to the total amount of platinum and silicon in the film is preferably 40 atomic percent or less, more preferably 5 atomic percent to 40 atomic percent, and still more preferably 5 atomic percent to 20 atomic percent. These percentages remain unchanged even when the first material is other than platinum. In other words, the percentage of the first material in the film is preferably 40 atomic percent or less, more preferably 5 atomic percent to 40 atomic percent, and still more preferably 5 atomic percent to 20 atomic percent. To prepare a three-dimensional network skeleton having a high porosity using a small amount of noble metal, such as platinum, the percentage of the first material, such as platinum, is preferably 40 atomic percent or less, and more preferably 20 atomic percent or less. Furthermore, to form a three-dimensional network skeleton in the second step as described below, the percentage of the first material is preferably at least 5 atomic percent.

The dispersion of the first material may be analyzed by surface observation after the film formation. However, when the first material is dispersed in the second material at the percentages described above, it is not always necessary to check the dispersion, for example, with SEM.

The sputtering source is not limited to the silicon target having a platinum chip thereon and may be a platinum target having a silicon chip thereon or a sintered target of platinum and silicon powders.

Furthermore, the film is formed at the substrate temperature preferably of room temperature (for example, 25° C.) to 300° C., and more preferably of 100° C. or less. Examples of the base substrate for the film formation include a Si wafer, a Si wafer having a $SiO_2$ film, and a Si wafer having a metal film having a thickness of several nanometers to several tens of nanometers thereon.

After the second step, that is, in a post-process, when the film needs to be separated from a wafer serving as the base substrate, a base film having a thickness of several nanometers can be disposed between the base substrate and the film. For example, the base film is a copper film.

Furthermore, a composite film of platinum and silicon may be formed on an organic resin sheet, such as a fluorocarbon resin sheet, by sputtering. This sheet may serve as an electrolyte film (or part of an electrolyte film) of a fuel cell. In a membrane electrode assembly, a catalyst layer can have a thickness of 100 nm to 800 nm by the control of film-forming conditions. A catalyst layer having a smaller thickness can result in an increase in the reduction rate of oxygen.

Examples of sputtering include magnetron sputtering, RF sputtering, DC sputtering, and ECR sputtering. Sputtering can be performed under conditions where plasma does not reach the base substrate for the film formation to prevent the film from being damaged.

Sputtering is a preferred film forming method. Other film forming methods include resistance heating evaporation, electron-beam evaporation, and ion plating.

Furthermore, any film forming method can be used, provided that the first material is uniformly dispersed in the film.

Examples of the first material include a noble metal of platinum or palladium, an alloy containing platinum or palladium, or a silicide of platinum or palladium. Examples of the second material include silicon.

(2) Second Step

A dry etching process for the film will be described.

Examples of dry etching include reactive ion etching and plasma etching. In the reactive ion etching, a high frequency power is applied to an electrode on which a substance to be etched is placed, generating a negative self-bias voltage. Ions generated in plasma are accelerated by the negative self-bias voltage and come into collision with the substance to be etched. In the plasma etching, a substance is etched by radicals generated in plasma without applying a bias to the substance.

A method for producing a structure according to the present invention can employ nonplasma etching (etching in the absence of plasma) using a fluorine-based reactant gas, such as $BrF_2$ or $XeF_2$, as dry etching.

For purposes of illustration, a xenon difluoride ($XeF_2$) gas is used herein.

Silicon can be etched at a high speed by a xenon difluoride ($XeF_2$) gas without plasma excitation. The film prepared in the first step is irradiated with a molecular flow of a xenon difluoride ($XeF_2$) gas. Silicon in the film is selectively etched away to form a structure having a three-dimensional network skeleton composed of a material including a noble metal. A three-dimensional network skeleton containing the first material may be formed during the film formation in the first step or during the dry etching in the second step. When the first material is uniformly dispersed, as determined by surface observation, in the second material contained in the film formed in the first step, the network can be formed in the second step.

According to the present invention, the skeleton is mainly composed of the first material of a noble metal and may contain a minor amount of the second material (for example, silicon).

Figure 4:
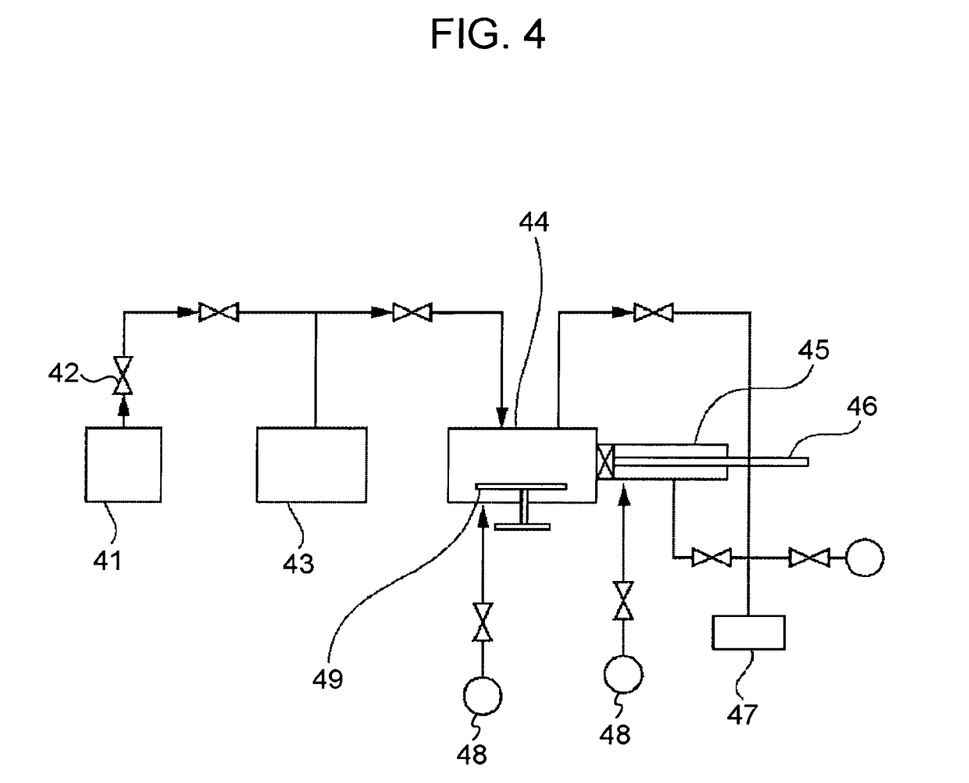
FIG. 4 is a schematic view of an apparatus for producing a structure according to the present invention.

FIG. 4 is a schematic view of a dry etching apparatus for producing a noble metal three-dimensional structure according to the present invention.

Specifically, an xenon difluoride ($XeF_2$) dry etching apparatus includes a xenon difluoride ($XeF_2$) container 41, a xenon difluoride ($XeF_2$) flow valve 42, a diffusion container 43, a processing chamber 44, a load lock chamber 45, a linear introducer 46, and a rotary pump 47. A nitrogen ($N_2$) gas 48 can be introduced into the processing chamber 44 and the load lock chamber 45.

A xenon difluoride ($XeF_2$) gas is supplied from the xenon difluoride ($XeF_2$) container 41 to the diffusion container 43. A sample film mounted on a Si substrate is introduced onto a turntable 49 in the processing chamber 44 through the linear introducer 46 and is irradiated with a xenon difluoride ($XeF_2$) molecular flow. A xenon difluoride ($XeF_2$) molecule comes into collision with the Si substrate to be dissociated into XeF+fluorine. The fluorine combines with silicon to form $SiF_4$. $SiF_4$ is discharged from the processing chamber 44. Thus, silicon in the sample film is etched away.

The amount of etched silicon can be controlled by the diffusive flow, that is, the diffusive pressure of xenon difluoride ($XeF_2$) flowing from the diffusion container 43 to the processing chamber 44 and the number of pulses. The amount of etched silicon depends on the ratio of a nitrogen gas and xenon difluoride, that is, the number of radicals in the system. The etching rate of silicon in the sample film can be controlled by the diffusive pressure and the number of pulses. In addition to the sample film, a proper quantity of silicon chip placed on a Si substrate can decrease the etching rate.

The porosity of a structure having a three-dimensional network skeleton depends on the amount of etched silicon. The porosity can be estimated by measuring the area of pores in a region, for example, of 300 nm×300 nm on a SEM image of a film.

The porosity of a structure according to the present invention is preferably 20% to 95%, more preferably 30% to 95%, and still more preferably 60% to 95%. When a film according to the present invention is used in a membrane electrode assembly described below, the porosity of a structure according to the present invention is preferably 60% to 90%.

When a film containing a first material of platinum and a second material of silicon is irradiated with a molecular flow of xenon difluoride ($XeF_2$) gas, silicon in the film is selectively etched away to produce a platinum three-dimensional network structure according to the present invention.

Since xenon difluoride ($XeF_2$) has a high selective etching ratio for various metals, insulators, and polymers, a substrate material can widely be selected from various materials other than a substance to be etched. Thus, xenon difluoride ($XeF_2$) is suitably used as an etching gas in a method according to the present invention.

A structure according to the present invention can be used as a catalyst in a membrane electrode assembly for a polymer electrolyte fuel cell. In addition, the structure can be made water-repellent for use in a fuel diffusion electrode.

The method for producing a structure according to the present invention can provide a three-dimensional network by a dry process, allowing for a stable production of the structure. Thus, the method is suitable for mass production and can be expected to find use in industrial applications. A noble metal three-dimensional network structure according to the present invention can be used with other materials and structures. The use of a noble metal three-dimensional network structure according to the present invention is not limited to a catalyst in a membrane electrode assembly.

(Structure Having Three-Dimensional Network Skeleton Composed of a Material Including Noble Metal)

Examples of a structure according to the present invention are specifically described below.

Figure 1A:
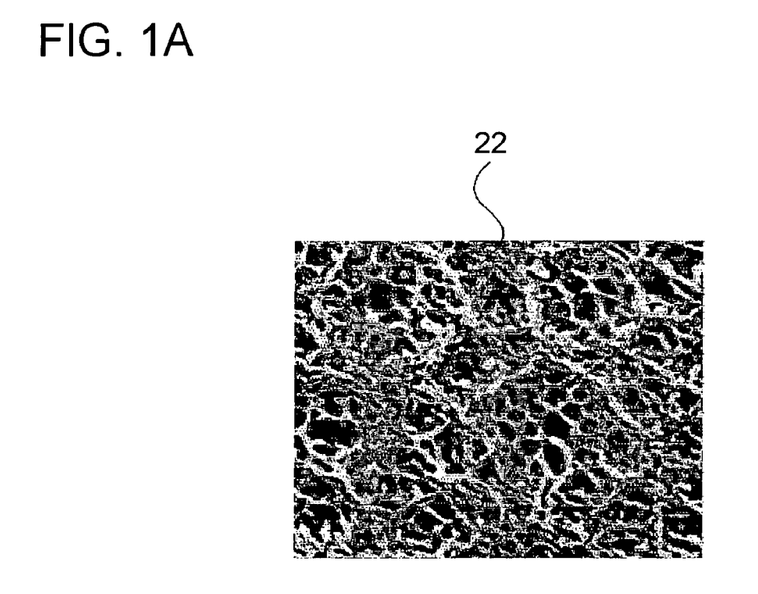
FIGS. 1A and 1B are SEM images of structures having a three-dimensional network skeleton according to the present invention.
Figure 1B:
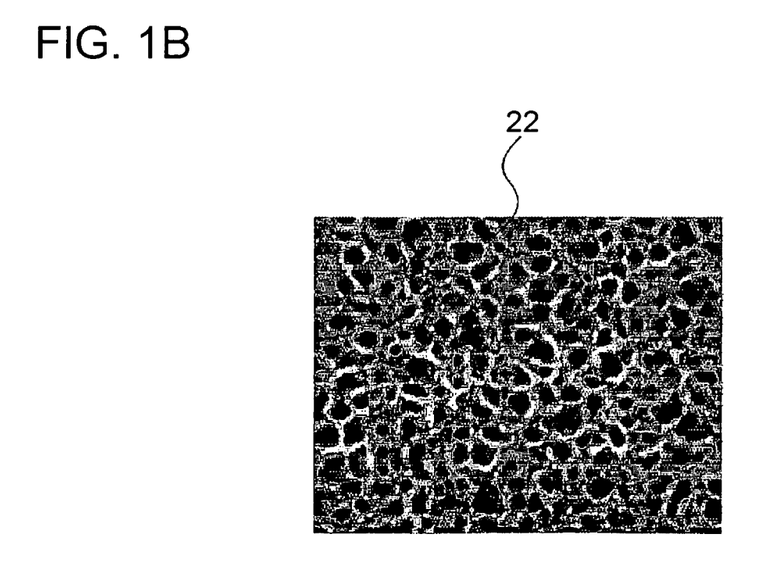

FIGS. 1A and 1B are field emission scanning electron microscope (FE-SEM) images of structures produced according to a method of the present invention.

FIGS. 1A and 1B show that noble metal structures according to the present invention have three-dimensional network structures. In FIG. 1A, a platinum-silicon composite film is dry-etched using a xenon difluoride ($XeF_2$) gas. In FIG. 1B, a palladium-silicon composite film is dry-etched using a xenon difluoride ($XeF_2$) gas.

Figure 2A:
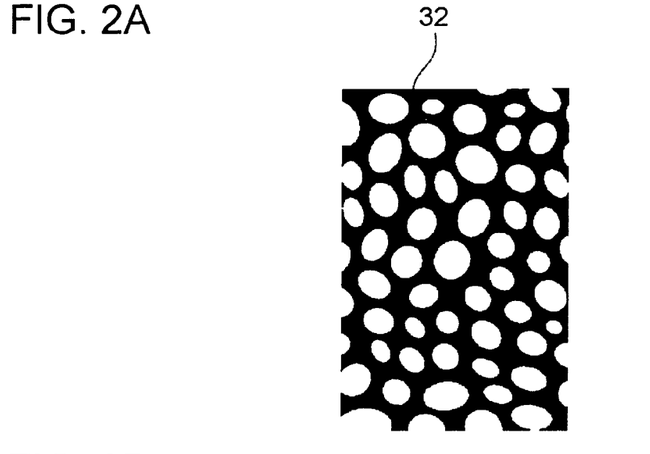
FIG. 2A is a partial schematic view of the noble metal three-dimensional network structures illustrated in FIGS. 1A and 1B.

FIG. 2A is a partial schematic view of the noble metal three-dimensional network structures 22 illustrated in FIGS. 1A and 1B.

The structures having a three-dimensional network skeleton composed of a material including a noble metal according to the present invention have a network structure 32 illustrated in FIG. 2A in the thickness direction in three dimensions.

A black part of the network structure 32 is a skeleton composed of a material including at least one noble metal element after dry etching.

Figure 2B:
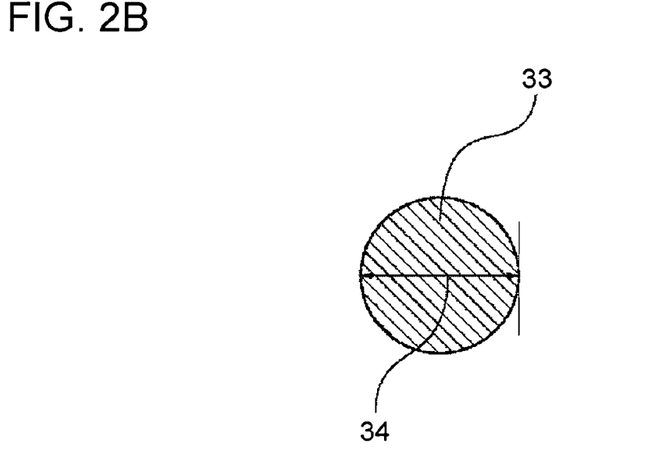
FIGS. 2B and 2C are schematic views of transverse sections of the noble metal three-dimensional network structures.
Figure 2C:
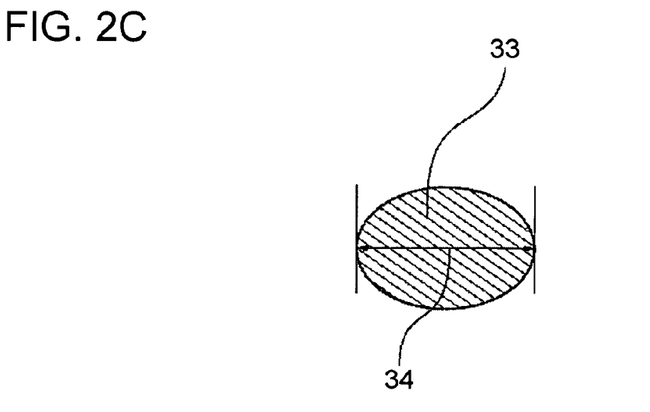

As illustrated in FIGS. 2B and 2C, the diameter of a skeleton composed of a material including a noble metal herein means the diameter or a maximum length 34 of a circle or the major axis or a maximum length 34 of an ellipse of a transverse section 33 of the noble metal three-dimensional network skeleton. Following this definition, the structure illustrated in FIG. 1A is a platinum three-dimensional network nano-structure having a diameter of 2 to 10 nm. The structure illustrated in FIG. 1B is a palladium three-dimensional network nano-structure having a diameter of 4 to 12 nm.

A structure according to the present invention has a skeleton having a maximum diameter of 20 nm or less. A structure including a skeleton having a maximum diameter of 20 nm to 100 nm can also be produced by increasing the atomic percent of a first material (platinum etc.) described in the earlier section "Method for producing structure having three-dimensional network skeleton."

A structure according to the present invention encompasses a structure including at least 60% of skeleton having the maximum diameter described above (for example, 20 nm or less) as determined by SEM observation (300 nm×300 nm). Thus, the present invention does not exclude a structure including a skeleton having a diameter of 100 nm or more.

A three-dimensional network structure including a skeleton composed of a material including at least one noble metal element can have a porosity of 20% to 95%. When a three-dimensional network structure including a skeleton having a porosity of more than 95% is used as a catalyst layer or part thereof in a fuel cell, the catalytic performance may be poor. When this porosity is less than 20%, the catalyst becomes expensive.

The porosity can be 60% to 90%. A structure having the porosity of this range is a three-dimensionally continuous dense structure having excellent gas permeability. Thus, when the structure is used as a catalyst layer or part thereof in a fuel cell, the contact interface between fuel and an electrolyte can be increased. The structure can have a porosity of 60% to 90% and include a skeleton having a diameter of 20 nm or less.

Examples of a material for the three-dimensional network skeleton include platinum, alloy containing platinum, and a mixture containing platinum. The material can be used for a catalyst electrode (catalyst layer) in a fuel cell.

Examples of a material contained in an alloy containing platinum or in a mixture containing platinum include gold, silver, copper, palladium, iridium, rhodium, ruthenium, iron, cobalt, nickel, chromium, tungsten, manganese, vanadium, rhenium, cobalt, lithium, lanthanum, strontium, yttrium, and osmium. The alloy containing platinum may be $Pt_{1-X}M_X$ (M is selected from the metals described above; X is 0.01 to 0.8).

When reformed gas is used as fuel, it may be necessary to prevent platinum from being poisoned by carbon monoxide or a sulfur compound. In this case, a platinum-ruthenium alloy is particularly effective.

A catalyst for use in a catalyst electrode may be formed of any material, provided that the oxidation reaction of a fuel, such as hydrogen, in an anode or the reduction reaction of a fuel, such as oxygen, in a cathode is promoted.

(Membrane Electrode Assembly)

A structure according to the present invention may be used in a membrane electrode assembly for a polymer electrolyte fuel cell. Specifically, the structure is used in a catalyst layer.

Figure 3A:
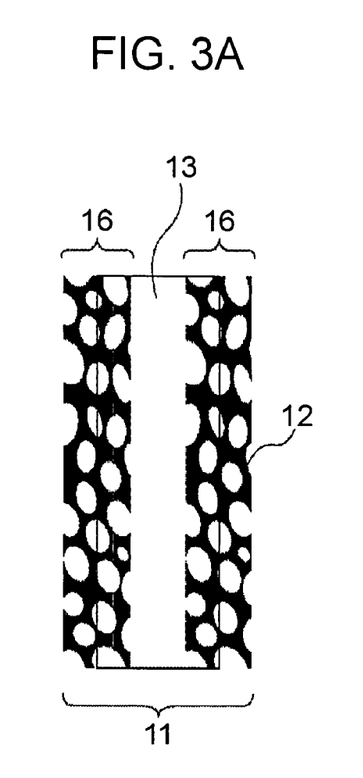
FIGS. 3A to 3C are schematic views of membrane electrode assemblies according to the present invention.
Figure 3B:
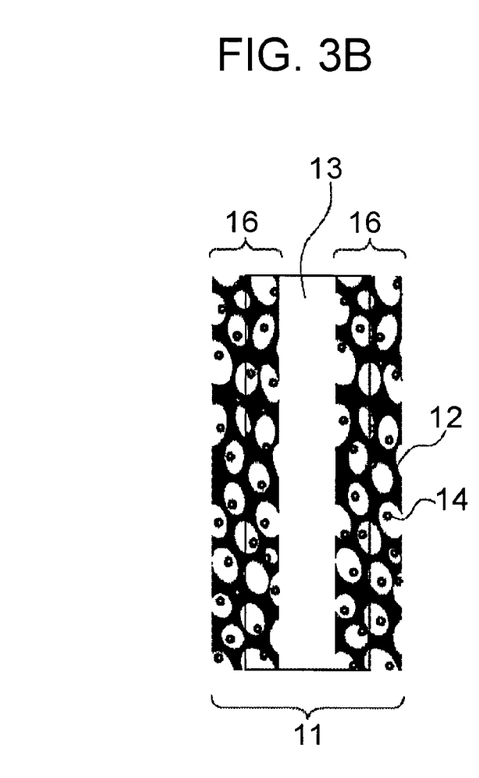
Figure 3C:
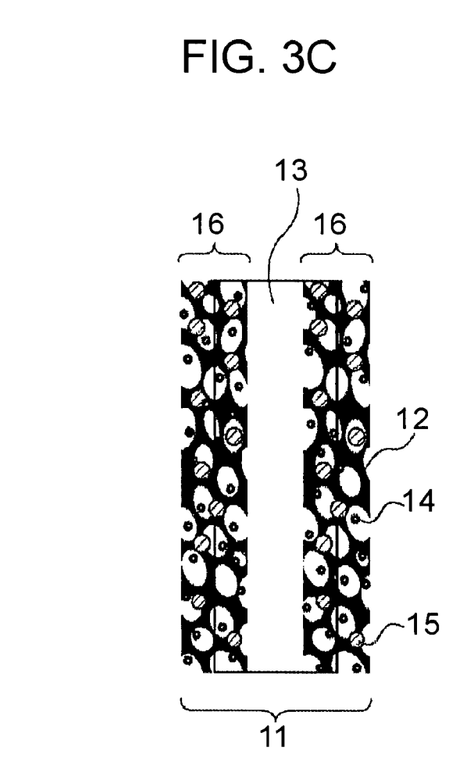

FIGS. 3A to 3C illustrate membrane electrode assemblies 11. A membrane electrode assembly 11 includes a solid polymer electrolyte 13 and catalyst layers 16 containing a catalyst of noble metal three-dimensional network structure 12.

The catalyst layers 16 in the membrane electrode assembly 11 may be formed only of the three-dimensional network structure 12 as illustrated in FIG. 3A or may be formed of a mixture of the three-dimensional network structure 12 and fine particles 14 as illustrated in FIG. 3B. As illustrated in FIG. 3C, the catalyst layers 16 may contain a carrier 15.

The noble metal three-dimensional network structure 12 can have a skeleton composed of a material including at least one noble metal element and having a maximum diameter of 20 nm or less. The maximum diameter can be 2 nm to 15 nm, and variations in the diameter of the skeleton can be small.

The solid polymer electrolyte 13 is described below.

The solid polymer electrolyte needs to function as an insulator for preventing a short circuit between an anode and a cathode and needs to have a high ionic conductivity to transfer a cation generated on the anode immediately to the cathode.

The solid polymer electrolyte can be formed of a material having a high hydrogen ion conductivity or a material having high permeability to an organic liquid fuel, such as methanol.

A representative example of a material having a high hydrogen ion conductivity is an organic polymer having a group that can release a hydrogen ion. Examples of the group that can release a hydrogen ion include a sulfonic acid group, a sulfinic acid group, a carboxylic acid group, a phosphonic acid group, a phosphinic acid group, a phosphate group, and a hydroxyl group.

Specific examples of the organic polymer include a perfluorocarbon sulfonic acid resin, a polystyrene sulfonate resin, a sulfonated polyamide imide resin, a sulfonated polysulfone resin, a sulfonated polyetherimide semipermeable membrane, a perfluorophosphonic acid resin, and a perfluorosulfonic acid resin. Examples of the organic polymer that is commercially available include a perfluorosulfonic acid resin, such as Nafion® from Du Pont, and hydrocarbon resins from Hoechst. The solid polymer electrolyte can be, but not limited to, any of those described above.

The fine particles 14 are described below.

As illustrated in FIGS. 3B and 3C, the membrane electrode assembly 11 may contain fine particles 14. The fine particles can be formed of a substance that functions as a catalyst or a promoter for enhancing the catalytic activity for a fuel cell. The material and the shape of the fine particles are appropriately determined in a manner that depends on the object of containing the fine particles. In particular, by consideration of increasing the reaction area of a noble metal three-dimensional network structure according to the present invention, the fine particles can have a diameter smaller than that of the noble metal three-dimensional network skeleton. The fine particles have a diameter preferably of 10 nm or less, and more preferably of 5 nm or less.

The carrier 15 is described below.

Fundamentally, a membrane electrode assembly includes a polymer film that can transfer a cation to an anode and a catalyst electrode that can remove electrons generated on the anode and a cathode, and thereby generates electricity. Thus, a carrier is not always necessary.

However, an electron transferring material is often used as a carrier in the membrane electrode assembly principally to reduce the platinum content.

Representative examples of the carrier include, but are not limited to, carbon. Examples of the carbon carrier include carbon blacks, such as furnace black, channel black, and acetylene black, activated charcoal, graphite, fullerene, carbon nanotube, and carbon fiber. These are used alone or in combination. The carrier may underlie a noble metal three-dimensional network structure. Alternatively, the carrier and a noble metal three-dimensional network structure may be dispersed in the membrane electrode assembly.

(Structure and Production Method of Membrane Electrode Assembly)

Figure 5:
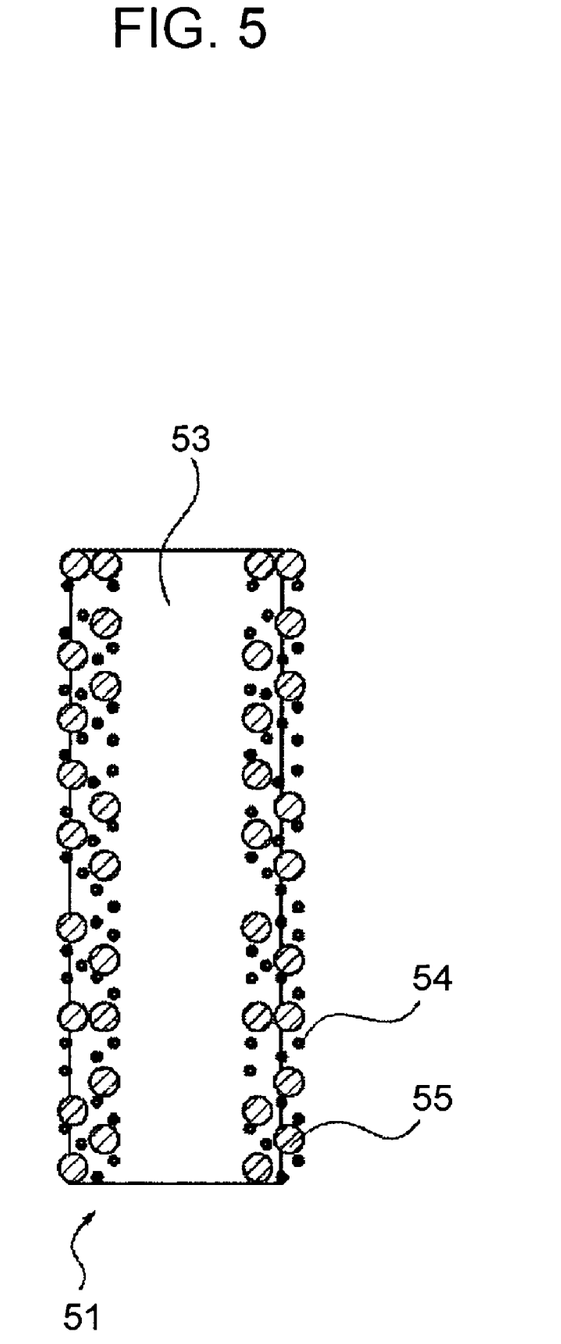
FIG. 5 is a schematic view of a membrane electrode assembly according to the present invention.

FIG. 5 illustrates a basic structure of a membrane electrode assembly 51 according to the present invention. This membrane electrode assembly includes a catalyst 54, a carrier 55, and a solid polymer electrolyte 53.

When hydrogen and oxygen are supplied as fuel to an anode and an cathode, respectively, in the membrane electrode assembly, the following reaction will occur.

Anode: $H_2 \rightarrow 2H^+ + 2e^-$

Cathode: $\frac{1}{2}O_2 + 2H^+ + 2e^- \rightarrow H_2O$

As is evident from this reaction scheme, the fuel supplied to the anode produces electrons and cations. Only the produced cations are transferred to the cathode and react with oxygen and consume electrons. This generates electricity.

Thus, it is important that the cathode and the anode are placed in the same membrane electrode assembly while they are completely separated with a solid polymer electrolyte.

Since the reaction occurs at the interface among a catalyst electrode, a solid polymer electrolyte, and a fuel, it is important to bring the solid polymer electrolyte into more extensive contact with the catalyst electrode. It is also important that a fuel is efficiently supplied to a deep part of the membrane electrode assembly. Thus, the mixing ratio of a catalyst electrode material and the solid polymer electrolyte may be an important parameter for improving the performance of the fuel cell.

The method for producing the membrane electrode assembly can broadly be classified into two.

In one method, a mixture of a catalyst and a solid polymer electrolyte solution is applied to a PTFE sheet (serving as a fuel diffusion layer) to form catalyst electrodes. The catalyst electrodes are placed on a solid polymer electrolyte film.

In the other method, substrates are placed on the catalyst electrodes after the catalyst electrodes are placed on both sides of the solid polymer electrolyte film. The first method is described in detail in Example 2.

Fuel is described below.

In a solid polymer electrolyte-catalyst fuel cell, the anode is supplied with a fuel that generates electrons and cations by the action of a catalyst electrode and a solid polymer electrolyte, such as hydrogen, reformed hydrogen, methanol, or dimethyl ether. The cathode is supplied with an oxidizing agent, such as air or oxygen, which receives cations and incorporates electrons. In view of reaction efficiency and practical use, the anode is suitably supplied with hydrogen or methanol and the cathode is suitably supplied with air.

(Structure and Production Method of Fuel Cell)

Figure 6:
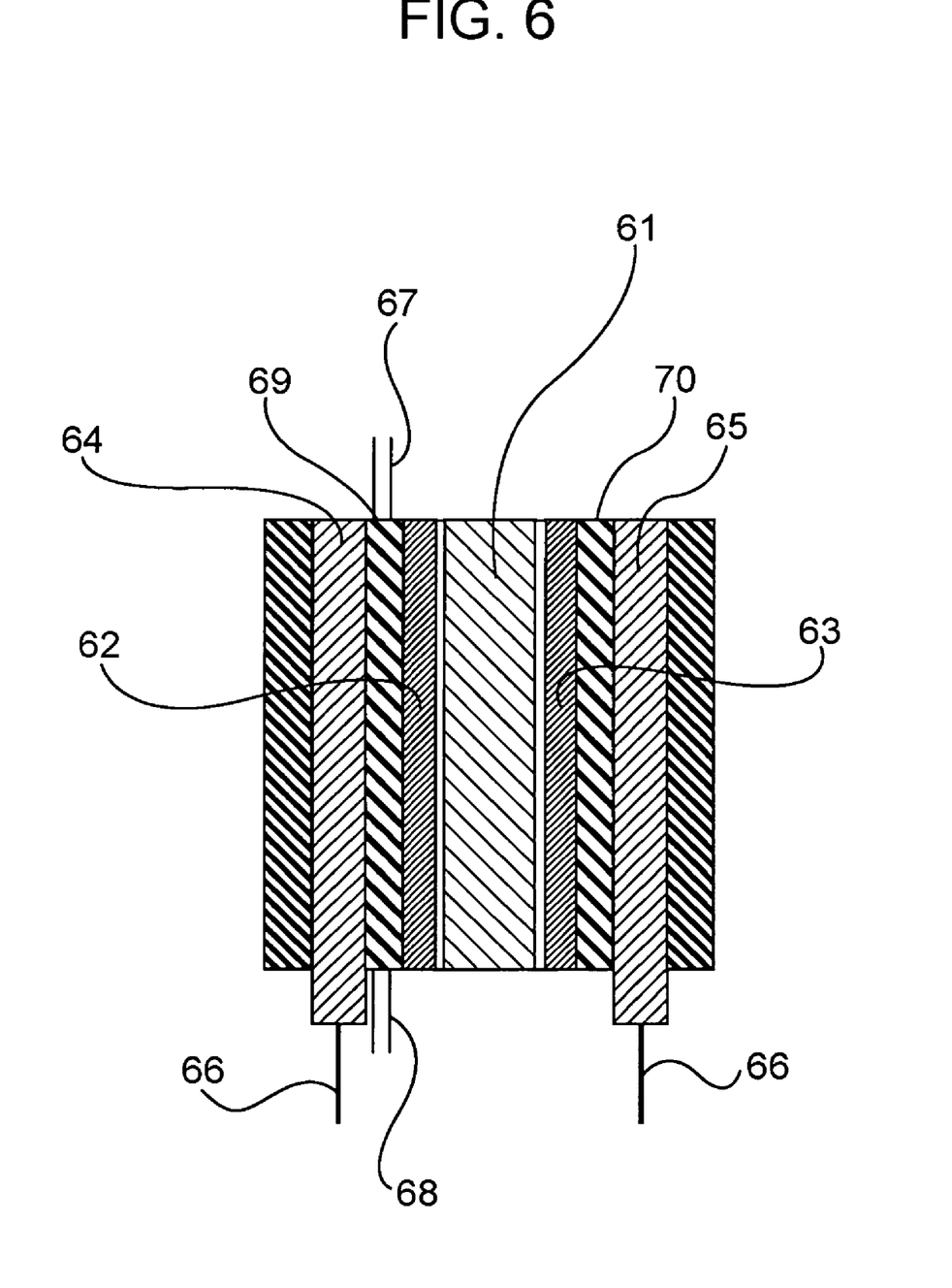
FIG. 6 is a schematic sectional view of a fuel cell according to the present invention.

FIG. 6 is a schematic sectional view of the structure of a fuel cell according to the present invention.

The fuel cell includes a solid polymer electrolyte 61, an anode catalyst layer 62, a cathode catalyst layer 63, an anodic current collector 64, a cathodic current collector 65, external output terminals 66, a fuel inlet 67, a fuel outlet 68, an anodic fuel diffusion layer 69, and a cathodic fuel diffusion layer 70. The chemical reaction occurs at the three-phase interface on the catalyst layer surface to generate electric power. In this fuel cell, at least one of the anode catalyst layer 62 and the cathode catalyst layer 63 is the above-mentioned structure, i.e., the structure according to the present invention.

Use of a plurality of membrane electrode assemblies, for example, a plurality of the membrane electrode assemblies illustrated in FIG. 5, can increase the voltage and the electric current. In this case, the application of a semiconductor process to the production of the membrane electrode assembly allows the fuel cell system to decrease its size and produce a higher power.

When hydrogen and air are supplied to the anode and the cathode, respectively, it is important to prevent the leakage of hydrogen. The cathode can be opened to the air.

The diffusion layers are electrically conductive members having a high porosity. The diffusion layers enhance the diffusion of a fuel and increase the number of three-phase interfaces (electrolyte-catalyst electrode-fuel interface). A carbon fiber fabric or a carbon paper is suitable for the diffusion layers.

A structure according to the present invention can be used not only in a solid polymer electrolyte of a cation-exchange type, but also as a catalyst electrode of a bipolar electrolyte fuel cell including an anode of a cation-exchange membrane and a cathode of an anion-exchange membrane.

EXAMPLES

While the present invention is described in detail below with reference to Examples, it is to be understood that the invention is not limited to these Examples.

Example 1

Production of Structure Having Three-Dimensional Network Skeleton

In this Example, a platinum-silicon composite film was first produced and then was dry-etched using a xenon difluoride gas to form a platinum three-dimensional network structure.

First, a copper base film was formed on a silicon (Si) wafer by RF magnetron sputtering.

A four-inch (101.6 mm) copper (Cu) target was used on a backing plate. Sputtering was performed with a RF power supply at an Ar flow rate of 50 sccm, a discharge pressure of 0.7 Pa, and an input power of 300 W. The substrate temperature was room temperature. A thin copper (Cu) film having a thickness of 50 nm was formed on the Si wafer.

Subsequently, a platinum-silicon composite film having a thickness of 100 nm was formed on the copper film on the Si wafer by RF magnetron sputtering. A four-inch (101.6 mm) silicon target including five pieces of 5 mm×5 mm platinum chips thereon was used on a backing plate.

Sputtering was performed with a RF power supply at an Ar flow rate of 19 sccm, a discharge pressure of 0.11 Pa, and an input power of 120 W. The substrate temperature was room temperature. Observation of the resulting platinum-silicon composite film (containing 30 atomic percent of platinum) with FE-SEM showed that estimated platinum portions were uniformly dispersed as viewed from above.

Then, the platinum-silicon composite film was fixed to a four-inch (101.6 mm) silicon wafer with a Kapton® tape. This silicon wafer was placed on a turntable of a $XeF_2$ dry etching apparatus. The platinum-silicon composite film was irradiated with one pulse of a $XeF_2$ molecular flow at the diffusive pressure of a $XeF_2$ diffusion container of 60 Pa. Silicon in the composite film was selectively etched away to provide a platinum three-dimensional network structure. Visual observation of the film after dry etching demonstrated that a portion irradiated with the $XeF_2$ molecular flow changed to light brown.

FE-SEM observation of the film after the $XeF_2$ dry etching showed that the film had a platinum three-dimensional network skeleton having a porosity of 65% and an average diameter of about 5 nm and extending in the thickness direction.

The specimen was dipped into aqueous nitric acid to dissolve copper. This isolated a platinum three-dimensional network nano-structure having a thickness of 100 nm and including a skeleton having a maximum diameter of 5 nm.

Example 2

Production of Membrane Electrode Assembly and Fuel Cell

A membrane electrode assembly was produced in the same manner as in the production of the membrane electrode assembly described above. Then, a fuel cell using hydrogen in the anode and air in the cathode was fabricated as follows.

First, 0.5 g of the platinum three-dimensional network nano-structure prepared in Example 1 was placed in a crucible. 0.2 ml of pure water was added to the crucible with a micropipette. 0.8 ml of 5% Nafion solution and then 0.1 ml of isopropyl alcohol were added to the crucible with a micropipette. The crucible was subjected to ultrasonic cleaning for five minutes. The mixture was stirred with a magnetic stirrer at 150 rpm. The dispersion of the platinum three-dimensional network nano-structure thus prepared was applied to a PTFE sheet by a doctor blade method. The catalyst sheet thus prepared was removed and was dried in the air.

The preparation of a solid polymer electrolyte film was described below. A Nafion® film was used in this Example. An aqueous hydrogen peroxide solution was heated to 80° C. A Nafion® film having a desired size was dipped into the solution for 60 minutes. Then, the Nafion® film was washed with water and was dipped into an aqueous sulfuric acid solution at 80° C. for 60 minutes. Then, the Nafion® film was washed with water and was dried.

The catalyst sheets on the PTFE sheet were adhered to the Nafion® film by hot pressing. Thus, a membrane electrode assembly including the Nafion® film and the platinum three-dimensional network nano-structure was prepared.

FIG. 6 is a schematic sectional view of the structure of a fuel cell including the membrane electrode assembly. The fuel cell includes a solid polymer electrolyte 61, an anodic catalyst layer 62, a cathodic catalyst layer 63, an anodic current collector 64, a cathodic current collector 65, external output terminals 66, a fuel inlet 67, a fuel outlet 68, an anodic fuel diffusion layer 69, and a cathodic fuel diffusion layer 70.

As a Comparative Example, a membrane electrode assembly and a fuel cell were fabricated by using platinum fine particles having an average diameter of 5 nm in place of the structure having a three-dimensional network skeleton.

These fuel cells were evaluated for the electric current (I)-voltage (V) characteristic of a single fuel cell. The fuel cell according to Example 2 outputted larger power than the fuel cell including the platinum fine particles according to the Comparative Example by 15%. It is believed that integration of a structure according to the present invention into a membrane electrode assembly can increase the number of three-phase interfaces (electrolyte-catalyst electrode-fuel) and permeability to a fuel gas, improving the power generation efficiency.

Thus, the present invention provides a new method for producing a structure having a three-dimensional network skeleton.

A structure according to the present invention is also applicable to a catalyst, an adsorbent, and a storage material for gas, such as hydrogen. A membrane electrode assembly according to the present invention has a high power-generation efficiency and can be utilized for electrical generating parts of various fuel cells ranging from a fuel cell for a small mobile device, such as a mobile phone, a notebook computer, or a digital video camera, to an automotive fuel cell, a residential fuel cell, and a small industrial fuel cell.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-234618 filed Aug. 12, 2005, which is hereby incorporated by reference herein in its entirety.

What is claimed is:

1. A method for producing a structure having a three-dimensional network skeleton, comprising the steps of:
    providing a film including a first material and a second material, the first material containing a noble metal and being dispersed uniformly in the second material; and
    removing the second material contained in the film by nonplasma dry etching using $BrF_2$ or $XeF_2$,
    wherein the noble metal is changed from a uniformly dispersed state to a wire-shaped network nano-structure having the three-dimensional network skeleton.

2. The method for producing a structure having a three-dimensional network skeleton according to claim 1, wherein an amount of the first material in the film is 5 to 40 atomic percent of a total amount of the first material and the second material.

3. The method for producing a structure having a three-dimensional network skeleton according to claim 1, wherein an amount of the first material in the film is 5 to 20 atomic percent of a total amount of the first material and the second material.

4. The method for producing a structure having a three-dimensional network skeleton according to claim 1, wherein the first material is platinum or palladium and the second material is silicon.

5. A structure having a three-dimensional network skeleton produced by the process according to claim 1, composed of a material including a noble metal, wherein a maximum diameter of a transverse section of the skeleton is 100 nm or less.

6. The structure according to claim 5, wherein the maximum diameter of the transverse section of the skeleton is 20 nm or less.

7. The structure according to claim 5, wherein a porosity of the structure is in a range from 30% to 95%.

8. The structure according to claim 5, wherein a porosity of the structure is in a range from 60% to 95%.

9. The structure according to claim 5, wherein the material forming the skeleton is platinum or palladium, an alloy containing platinum or palladium, or a silicide of platinum or palladium.

10. A membrane electrode assembly for a fuel cell, comprising:
    a solid polymer electrolyte; and
    a catalyst layer comprising a structure composed of a material including a noble metal and having a three-dimensional network skeleton, which is produced by a method comprising the steps of:
        providing a film including a first material and a second material, the first material containing the noble metal and being dispersed uniformly in the second material; and
        removing the second material contained in the film by nonplasma dry etching using $BrF_2$ or $XeF_2$,
    wherein the noble metal is changed from a uniformly dispersed state to a network nano-structure,
    wherein a maximum diameter of a transverse section of the skeleton is 100 nm or less.

11. The membrane electrode assembly according to claim 10, wherein the catalyst layer further comprises fine particles formed of a substance that functions as a catalyst or as a promoter for enhancing catalytic activity of the fuel cell.

12. The membrane electrode assembly according to claim 10, wherein the catalyst layer further comprises an electron transferring material as a carrier.

13. A fuel cell comprising:
    the membrane electrode assembly according to claim 10;
    an anodic fuel diffusion layer;
    a cathodic fuel diffusion layer;
    an anodic collector; and
    a cathodic collector,
    wherein the membrane electrode assembly is disposed between the anodic fuel diffusion layer and the cathodic fuel diffusion layer, and the anodic fuel diffusion layer and the cathodic fuel diffusion layer are disposed between the anodic collector and the cathodic collector.

14. The fuel cell according to claim 13, wherein the catalyst layer is disposed between the solid polymer electrolyte and one of the anodic fuel diffusion layer and the cathodic fuel diffusion layer.

* * * * *